United States Patent [19]
Hagg

[11] Patent Number: 5,455,207
[45] Date of Patent: Oct. 3, 1995

[54] COLORED GLASS-CERAMICS AND METHOD

[75] Inventor: Sandra L. Hagg, Corning, N.Y.

[73] Assignee: Corning Incorporated, Corning, N.Y.

[21] Appl. No.: 299,354

[22] Filed: Sep. 1, 1994

[51] Int. Cl.[6] .................................................. C03C 10/16
[52] U.S. Cl. ................................... 501/3; 501/4; 501/71
[58] Field of Search ....................................... 501/3, 4, 71

[56] References Cited

U.S. PATENT DOCUMENTS 2,938,808  5/1960  Duncan et al. ............................ 501/71
4,608,348  8/1986  Beall et al. .
4,786,617  11/1988  Andrieu et al. ............................. 501/3
5,070,043  12/1991  Amundson, Jr. et al. .

Primary Examiner—Karl Group
Attorney, Agent, or Firm—Milton M. Peterson

[57] ABSTRACT

A color package is disclosed that provides a light ivory tint in potassium fluorrichterite glass-ceramic materials containing a cristobalite secondary crystal phase. The package includes $Fe_2O_3$, NiO, Se and, optionally, cobalt oxide within limited ranges.

9 Claims, 1 Drawing Sheet

5,455,207

COLORED GLASS-CERAMICS AND METHOD

FIELD OF THE INVENTION

The field is glass-ceramic materials and production of colors therein.

BACKGROUND OF THE INVENTION

A glass-ceramic is a material having at least one crystalline phase thermally developed in a uniform pattern throughout at least a portion of a glass precursor. Glass-ceramics have been known for over 30 years since being described in U.S. Pat. No. 2,920,971 (Stookey). They find application in diverse areas, an area of particular interest being the fabrication of articles used in the preparation and serving of food. Such articles include cookware, bakeware, tableware and flat cooktops.

In general, production of a glass-ceramic material involves three major steps:

1. Melting a mixture of raw materials, usually containing a nucleating agent, to produce a glass.
2. Forming an article from the glass and cooling the glass below its transformation range.
3. Crystallizing ("ceramming") the glass article by an appropriate thermal treatment. The thermal treatment usually involves a nucleating step at a temperature slightly above the transformation range. This is followed by heating to a somewhat higher temperature to cause crystal growth on the nuclei.

U.S. Pat. No. 4,608,348 (Beall et al.) describes a family of glass-ceramics having potassium fluorrichterite as a primary crystal phase with a secondary crystal phase of at least 10% by volume cristobalite. The glass-ceramic materials are described as being highly crystalline, exhibiting superior toughness against fracture propagation and having a modulus of rupture in excess of 20,000 psi.

The glass-ceramics disclosed in the Beall et al. patent have compositions consisting essentially of, expressed in weight percent on the oxide basis:

| | |
|---|---|
| $SiO_2$ | 65–69 |
| $Al_2O_3$ | 0.75–3.5 |
| MgO | 13.5–17.5 |
| CaO | 3–4.8 |
| $Li_2O$ | 0.5–2.0 |
| $Na_2O$ | 1.5–3.3 |
| $K_2O$ | 4.2–6.0 |
| BaO | 0–2.5 |
| $P_2O_5$ | 0–2.5 |
| F | 3.3–5.5 |

Optionally, up to 5 mole percent total of compatible metal oxides, such as, SrO, $TiO_2$, $B_2O_3$, $ZrO_2$ and ZnO, are contemplated. $As_2O_3$ and $Sb_2O_3$ are suggested as fining agents, and various known colorants may be present in conventional amounts.

The crystal phase in a potassium fluorrichterite glass-ceramic is a polymeric chain silicate in which a double, or higher order, multiple chain forms. A characteristic feature is a high MgO content which leads to rapid crystallization and a low, residual glass content. However, some residual glass content is necessary to avoid shattering of the crystallized material during cooling.

In addition to high MgO content, the compositions contain relatively high contents of $K_2O$, $Li_2O$ and F, coupled with relatively low $Na_2O$ and CaO contents. These composition considerations contribute to low thermal distortion in a formed glass article during heat treatment to convert the glass to a glass-ceramic.

The potassium fluorrichterite glass-ceramics have found commercial application in the dinnerware field. U.S. Pat. No. 5,070,043 (Amundson et al.) describes a color package for a pressed cup having potassium fluorrichterite as a primary crystal phase and cristobalite as a secondary phase in accordance with the Beall et al, teaching. The cup has a beige color designed to match a laminated dinnerware line sold under the CORNERSTONE trademark. The color package consists of:

0.065–0.16% $Fe_2O_3$ 0.055–0.16% NiO 0.0015–0.0029% Se

0–0.0014% $Co_3CO_4$

The color package is further defined with reference to a polygon encompassing the x and y color coordinates. The minimum x value is 0.3245 and the minimum y value is 0.3333.

The present invention also provides a color package for a potassium fluorrichterite glass-ceramic in accordance with the Beall et al. patent teaching. In particular, it provides a line of glass-ceramic dinnerware having an attractive, light ivory color.

SUMMARY OF THE INVENTION

The article of the invention is an ivory-colored, opaque, glass-ceramic article having potassium fluorrichterite as a primary crystal phase, having a secondary crystal phase of cristobalite amounting to at least 10% by volume of the glass-ceramic, and having a color package consisting of:

0.045–0.065% $Fe_2O_3$ 0.015–0.035% NiO

2–8 ppm Se

0–0.0014% $CO_3O_4$.

The method is a method of producing an ivory color in an opaque glass-ceramic article which comprises mixing a batch for a precursor glass capable of being thermally converted to a glass-ceramic having a primary crystal phase of potassium fluorrichterite and a secondary crystal phase of cristobalite amounting to at least 10% by volume of the glass-ceramic, incorporating, in the glass batch, materials that provide a color package consisting of:

0.045–0.065% $Fe_2O_3$ 0.015–0.035% NiO

2–8 ppm Se

0–0.0014% $CO_3O_4$ melting the batch, forming an article from the glass and heat treating the article to form a glass-ceramic having a primary crystal phase of potassium fluorrichterite and a secondary crystal phase of cristobalite amounting to at least 10% by volume of the glass-ceramic.

PRIOR ART

In addition to the patents noted earlier, attention is also directed to pending application Ser. No. 08/258,268 filed Jun. 10, 1994 in the name of W. D. Amundson, Jr., assigned to the assignee of the present application, and entitled CHAMPAGNE COLORED GLASSES. The Amundson, Jr. application describes use of a color package consisting of 0.05–0.25% $Fe_2O_3$, >25–175 ppm NiO and >10–100 ppm Se to produce a champagne color in a soda lime silicate base glass.

BRIEF DESCRIPTION OF THE DRAWING

The single FIGURE in the accompanying drawing is a graphical representation of chromaticity coordinates x and y (Illuminant C). The FIGURE contains a color coordinate box defining the ivory color of the present invention in terms of color coordinate limits.

DESCRIPTION OF THE INVENTION

Figure 1:
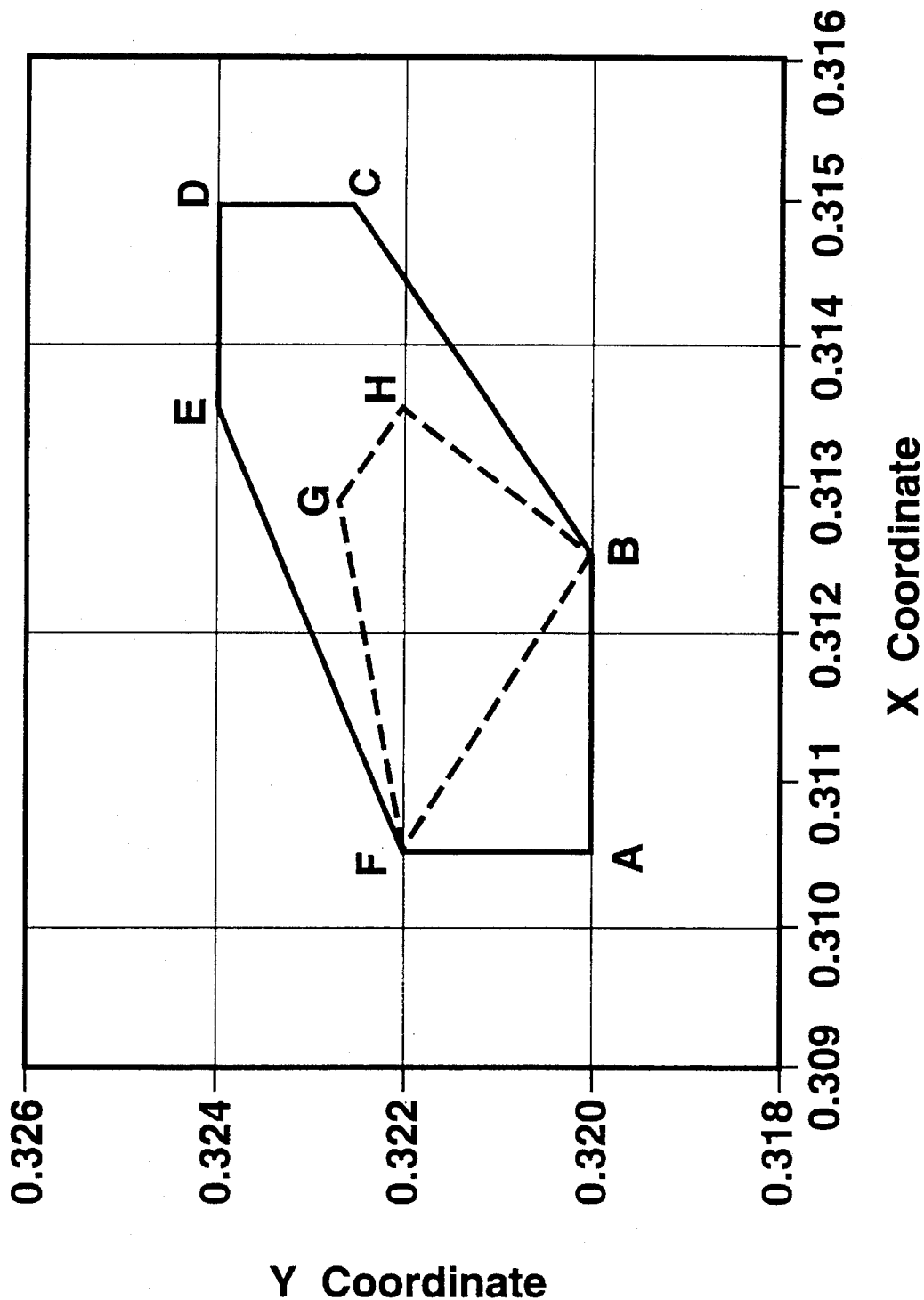

The invention is based in large measure on discovery of a unique color package. The package produces an ivory color in an opaque glass-ceramic as described in the Beall et al.—348 patent. That is a glass-ceramic having potassium fluorrichterite as its primary crystal phase and a secondary crystal phase of cristobalite amounting to at least 10% by volume of the glass-ceramic. The color produced is such a light ivory that it is sometimes referred to as a creamy white.

The term "color package" indicates a combination of certain glass colorants, customarily metal oxides and/or metals, in certain proportions. These colorants either produce, or control production of, a particular color in a glass or glass-ceramic material.

The present color package consists of a small amount of selenium (Se) acting in conjunction with oxides of iron ($Fe_2O_3$) and nickel (NiO), and, optionally, cobalt ($Co_3O_4$). The package components, expressed in percent by weight or parts per million (ppm) based on the total glass-ceramic composition, fall within the following ranges:

| | |
|---|---|
| $Fe_2O_3$ | 0.045–0.065% |
| NiO | 0.015–0.035% |
| Se | 2–8 ppm |
| $Co_3O_4$ | 0–0.0014% |

The presence of a minute amount of $Co_3O_4$, as a tramp impurity in other batch materials, is customarily inevitable. A small amount of this oxide usually has little or no effect in an opaque glass-ceramic. Accordingly, up to about 14 ppm is permitted in the present glass-ceramics.

The present color package is generally effective in glass-ceramics characterized by a predominant crystal phase of potassium fluorrichterite. As described in the Beall et al.—348 patent, these glass-ceramics fall within certain composition ranges. These ranges are recited in the Background section of this application. They represent the base glass composition ranges for present purposes.

The components of the color package have little or no effect on glass-ceramic properties, other than color. Nor do they have any appreciable effect on the production methods for the precursor glasses, or the crystallization of those glasses to form glass-ceramics. Accordingly, the teachings of the Beall et al. patent with respect to these matters are incorporated by reference in their entirety.

The color package may be introduced by incorporating components in their entirety in the batch fed to a melting unit. However, the package is readily adaptable to use in a forehearth colorant additive system. In such a system, a base glass composition is melted in a melting furnace, and the color package, or a portion thereof, is added as the molten glass passes through a forehearth.

The method and equipment used to add a colorant material to a molten glass in a forehearth are referred to as a forehearth coloring system, or a color cell. Such systems (color cells) have been in use for at least 30 years. They have been used primarily, however, to impart colors to soda lime glasses, in particular green or blue colors to soda lime glass bottles. Currently, color cells are employed to introduce two types of glass colorants: Unmelted, concentrated colorant in particulate form and melted color frits. The former is favored in the United States, while the latter is more popular in Europe.

Early trials demonstrated that an ivory color could be produced in a potassium fluorrichterite-cristobalite type glass-ceramic. The color package employed consisted of 0.049% $Fe_2O_3$, 0.029% NiO and 4 ppm Se. However, the resulting article had a slight greenish tint that was deemed less than desirable for the ware being designed.

Accordingly, an experimental trial was scheduled with the purpose of securing a wide range of shades from which a color target could be selected. This trial was scheduled during a transition between precursor glasses. The glass being melted before the transition was a precursor glass for a clear white, that is, opaque, glass-ceramic ceramic product. The transition was to a precursor glass for production of a beige-colored product as described by the Amundson, Jr. et al. patent.

Plates and cups were collected at half-hour intervals during a period of time early in the transition cycle. The cups were glazed with a non-lead glaze and cerammed using a commercial one-step process. The plates were cerammed and glazed separately so that supporting formers could be used during ceramming.

Samples of the plates and cups were taken each half hour. They were analyzed by x-ray fluorescence diffraction (XRF) for contents of each colorant component. Also, colors were measured in terms of x and y coordinates using the CIE system based on Illuminant C.

TABLE II sets forth selected data measured on the samples. Since changes in both the colorant amounts and the color produced were small, data on samples taken each hour are reported. Oxides of iron and nickel are given in percent while Se and $Co_3O_4$ are given in ppm. All measurements were obtained by x-ray fluorescence procedures on the samples. The corresponding color coordinates, as measured employing a Minolta CR-300 colorimeter, are also reported.

TABLE II

| Time | $Fe_2O_3$ | NiO | Se | $Co_3O_4$ | x | y |
|---|---|---|---|---|---|---|
| 2:00 | 0.049 | 0.010 | 1 | 7 | 0.3080 | 0.03170 |
| 3:00 | 0.049 | 0.012 | 0 | 7 | 0.3085 | 0.3176 |
| 4:00 | 0.051 | 0.015 | 2 | 8 | 0.3097 | 0.3186 |
| 5:00 | 0.054 | 0.018 | 3 | 8 | 0.3108 | 0.3198 |
| 6:00 | 0.057 | 0.022 | 4 | 6 | 0.3116 | 0.3205 |
| 7:00 | 0.061 | 0.028 | 4 | 7 | 0.3131 | 0.3227 |
| 8:00 | 0.063 | 0.034 | 6 | 6 | 0.3148 | 0.3238 |

In the accompanying drawing, the single FIGURE employs the CIE chromaticity coordinate system to graphically represent the invention. In the FIGURE, x coordinates are plotted on the horizontal axis and y coordinates are plotted on the vertical axis. The polygon ABCDEFA encompasses coordinate value combinations that provide generally acceptable colors in accordance with the invention. The color coordinate value ranges for this area are:

x=0.3105 to 0.3150 y=0.3200 to 0.3240

The x and y coordinate values for the points on the polygon ABCDEFA are as follows:

|   | x | y |
|---|---|---|
| A | 0.3105 | 0.3200 |
| B | 0.3125 | 0.3200 |
| C | 0.3150 | 0.3225 |
| D | 0.3150 | 0.3240 |
| E | 0.3135 | 0.3240 |
| F | 0.3105 | 0.3220 |

It will be seen from TABLE II, and even more clearly from the drawing, that the $Fe_2O_3$ and NiO oxide colorants, and also the x and y color coordinates, increase proportionally with the range of acceptable color. Accordingly, a further defining limit of $Fe_2O_3$:NiO weight ratios within the ratios of 2:1 to 3:1 can be assigned. Polygon BFGHB, within the larger polygon ABCDEFA, is based on samples taken between 6:00 and 7:00 hours. The points G and H have x and y coordinate values of:

|   | x | y |
|---|---|---|
| G | 0.3130 | 0.3226 |
| H | 0.3136 | 0.3220 |

The color package for this area, which provides preferred shades of ivory color, is:

0.055–0.062% $Fe_2O_3$ 0.020–0.028% NiO

4–6 ppm Se.

The 6:30 sample was selected as a tentative preferred target. This sample has the following measured colorant amounts and color coordinates:

0.059% $Fe_2O_3$ 0.026% NiO 4 ppm Se 7 ppm $Co_3O_4$ x=0.3123 y=0.3218

Y=76

The analyzed base glass composition, exclusive of colorants, in weight percent was:

| 67.7% | $SiO_2$ |
|---|---|
| 1.6% | $Al_2O_3$ |
| 14.0% | MgO |
| 4.7% | CaO |
| 0.2% | BaO |
| 1.2% | $P_2O_5$ |
| 3.2% | $Na_2O$ |
| 4.8% | $K_2O$ |
| 3.3% | F |
| 0.03% | $Sb_2O_3$ |
| 0.05% | $ZrO_2$ |

The $ZrO_2$ content was not intentionally added to the batch. Rather, it was introduced through glass cullet or other batch materials.

The precursor glass was melted in a tank delivering 20 tons per day and operating at a peak temperature of 1450° C. The cups and plates were cerammed on a normal production schedule. This involved heating to a temperature on the order of 975° C. over a time span of five hours; holding at temperature for three hours; and cooling over a period of two hours.

I claim:

1. An ivory-colored, opaque, glass-ceramic article having potassium fluorrichterite as a primary crystal phase, having a secondary crystal phase of cristobalite amounting to at least 10% by volume of the glass-ceramic, and having a color package consisting of:

0.045–0.065% $Fe_2O_3$ 0.015–0.035% NiO

2–8 ppm Se

0–0.0014% $Co_3O_4$.

2. A glass-ceramic article in accordance with claim 1 having a color defined by x and y coordinates within the polygon ABCDEFA in the accompanying drawing.

3. A glass-ceramic article in accordance with claim 1 having a composition, calculated in weight %, and in addition to the color package, consisting essentially of components that, as calculated in weight percent on an oxide basis, fall within the following ranges:

| 65–69% | $SiO_2$ |
|---|---|
| 0.75–3.5% | $Al_2O_3$ |
| 13.5–17.5% | MgO |
| 3–4.8% | CaO |
| 0–2.5% | BaO |
| 1.5–3.3% | $Na_2O$ |
| 4.2–6.0% | $K_2O$ |
| 0.5–2% | $Li_2O$ |
| 3.3–5.5% | F |
| 0–2.5% | $P_2O_5$. |

4. A glass-ceramic article in accordance with claim 1 wherein the color package consists of:

0.055–0.062% $Fe_2O_3$ 0.020–0.028% NiO

4–6 ppm Se.

5. A glass-ceramic article in accordance with claim 4 having a color defined by x and y coordinates within the polygon BFGHB in the accompanying drawing.

6. A glass-ceramic article in accordance with claim 3 wherein the composition has the additional limitation that the weight ratio of $Fe_2O_3$:NiO is at least 2:1, but not over 3:1.

7. A glass-ceramic article in accordance with claim 3 having essentially the following analyzed composition, exclusive of impurities, in weight %:

| 67.7% | $SiO_2$ |
|---|---|
| 1.6% | $Al_2O_3$ |
| 14.0% | MgO |
| 4.7% | CaO |
| 0.2% | BaO |
| 1.2% | $P_2O_5$ |
| 3.2% | $Na_2O$ |
| 4.8% | $K_2O$ |
| 3.3% | F |
| 0.059% | $Fe_2O_3$ |
| 0.026% | NiO |
| 0.0004% | Se |
| 0.0007% | $Co_3O_4$. |

8. A method of producing an ivory color in a opaque glass-ceramic article which comprises mixing a batch for a precursor glass capable of being thermally converted to a glass-ceramic having a primary crystal phase of potassium fluorrichterite and a secondary crystal phase of cristobalite amounting to at least 10% by volume of the glass-ceramic, incorporating, in the glass batch, materials that provide a color package consisting of:

0.045–0.065% $Fe_2O_3$ 0.015–0.035% NiO

2–8 ppm Se

0–0.0014% $CO_3O_4$ melting the batch, forming an article from the glass and heat treating the article to form a glass-ceramic having a primary crystal phase of potassium fluorrichterite and a secondary crystal phase of cristobalite amounting to at least 10% by volume of the glass-ceramic, 9. A method in accordance with claim 8 which comprises melting a batch that provides no more than 0.065 weight % $Fe_2O_3$ and no more than 0.0014% $CO_3O_4$ in the glass and adding a forehearth additive that provides 0.015–0.035% NiO and 2–8 ppm Se in the glass.

* * * * *